(12) United States Patent
Makino et al.

(10) Patent No.: US 7,008,470 B2
(45) Date of Patent: Mar. 7, 2006

(54) CANISTER

(75) Inventors: Katsuhiko Makino, Ohbu (JP); Ryuji Kosugi, Ohbu (JP); Tomonari Toki, Ohbu (JP)

(73) Assignee: Aisan Kogyo Kabushiki Kaisha, Ohbu (JP)

( * ) Notice: Subject to any disclaimer, the term of this patent is extended or adjusted under 35 U.S.C. 154(b) by 175 days.

(21) Appl. No.: 10/641,297

(22) Filed: Aug. 15, 2003

(65) Prior Publication Data

US 2004/0055468 A1  Mar. 25, 2004

Related U.S. Application Data

(63) Continuation-in-part of application No. 10/012,705, filed on Dec. 12, 2001, now abandoned.

(30) Foreign Application Priority Data

Dec. 25, 2000  (JP)  .............................. 2000-404629

(51) Int. Cl.
*B01D 53/02* (2006.01)
*F02M 25/08* (2006.01)

(52) U.S. Cl. .................... 96/131; 96/139; 96/144; 96/152; 96/154; 123/519

(58) Field of Classification Search ................ 96/131, 96/132, 134–137, 139, 147, 149, 152–154, 96/144; 55/385.3; 123/518–520
See application file for complete search history.

(56) References Cited

U.S. PATENT DOCUMENTS 4,386,947 A * 6/1983 Mizuno et al. ............... 96/137

| 5,207,808 A | * | 5/1993 | Haruta et al. | ................ 96/131 |
| 5,398,660 A | * | 3/1995 | Koyama et al. | ............ 123/519 |
| 5,456,237 A | * | 10/1995 | Yamazaki et al. | ........... 123/520 |
| 5,479,904 A | * | 1/1996 | Fujimori et al. | ............. 123/520 |
| 5,487,369 A | * | 1/1996 | Hara et al. | ................... 123/520 |

(Continued)

FOREIGN PATENT DOCUMENTS

JP      57-681635       * 10/1980

(Continued)

OTHER PUBLICATIONS

New Edition, "Activated Carbon"—Basis & Application, First Published Mar. 1, 1992, Publishing: Kodansha, ISBN4-06-153337-1, pp. 76-83.

(Continued)

*Primary Examiner*—Robert H. Spitzer
(74) *Attorney, Agent, or Firm*—Stevens, Davis, Miller & Mosher, LLP

(57) ABSTRACT

A canister, for inhibiting a diffusion phenomenon in an adsorbent layer as much as possible and certainly adsorbing fed evaporated fuel to inhibit blow-by of the evaporated fuel into the atmosphere, is constituted by filling a first adsorbent layer of the canister with activated carbon A having a large evaporated fuel adsorption and a weak holding power, and filling a second and a third adsorbent layers with activated carbon B having an intermediate evaporated fuel adsorption and a weak holding power and therefore having characteristics that the residual amount of the low boiling point components in the evaporated fuel after purge is small, whereby after the high temperature standing of the canister, the discharge of the evaporated fuel into the atmosphere can be inhibited.

30 Claims, 8 Drawing Sheets

U.S. PATENT DOCUMENTS

| | | | | |
|---|---|---|---|---|
| 5,501,723 | A * | 3/1996 | Andress et al. | 96/131 |
| 5,564,398 | A * | 10/1996 | Maeda et al. | 123/520 |
| 5,623,911 | A * | 4/1997 | Kiyomiya et al. | 123/520 |
| 5,634,450 | A * | 6/1997 | Hara et al. | 123/519 |
| 6,334,889 | B1 * | 1/2002 | Smolarek et al. | 96/149 |
| 6,524,374 | B1 * | 2/2003 | Moriyama et al. | 96/131 |
| 2001/0015134 | A1 * | 8/2001 | Uchino et al. | 96/130 |
| 2001/0020418 | A1 * | 9/2001 | Yamafuji et al. | 96/130 |
| 2003/0024397 | A1 * | 2/2003 | Meiller et al. | 96/139 |
| 2004/0261777 | A1 * | 12/2004 | Ogawa | 123/698 |

FOREIGN PATENT DOCUMENTS

JP        60-100559     *   7/1985

OTHER PUBLICATIONS

Chemical Seminar No. 16: "Adsorption Science," Published Jul. 30, 1991, Publishing: Maruzen Co., Ltd., ISBN 4-621-03617-3 C3343, pp. 14-17, pp. 46-49, pp. 66-75 and pp. 86-97.

* cited by examiner

FIG.6

| ACTIVATED CARBON | HOLDING POWER OF EVAPORATED FUEL | ADSORPTION OF EVAPORATED FUEL | RESIDUAL AMOUNT OF LOW BOILING POINT COMPONENTS IN EVAPORATED FUEL AFTER PURGE ※1 | BLOW-BY AMOUNT DURING INFLOW OF EVAPORATED FUEL | | REMARKS |
|---|---|---|---|---|---|---|
| | | | | NO STANDING | STANDING WAS DONE | |
| A | WEAK | MUCH | INTERMEDIATE | LITTLE | MUCH | |
| B | WEAK | INTERMEDIATE | LITTLE | LITTLE | LITTLE | |
| C | STRONG | LITTLE | MUCH | LESS | MUCH | TO INHIBIT INCREASE OF BLOW-BY AMOUNT AFTER STANDING, IT IS NECESSARY TO DECREASE ※1. |

CANISTER

CROSS REFERENCE

This is a continuation in part application of U.S. application Ser. No. 10/012,705, filed Dec. 12, 2001, now abandoned, the subject matter of which is incorporated by reference herein.

FIELD OF THE INVENTION

The present invention relates to a canister for an evaporated fuel treating apparatus of an internal combustion engine, and more specifically, it relates to a canister capable of preventing the discharge of an evaporated fuel into the atmosphere.

DESCRIPTION OF THE RELATED ART

In a conventional canister for an evaporated fuel treating apparatus, an evaporated fuel generated from a fuel tank is adsorbed by an adsorbent received in a canister container during the stop of the engine, and the adsorbed fuel is purged by a negative pressure of an intake pipe and then burnt in a combustion chamber, after the start of the engine.

In this kind of canister, the so-called blow-by phenomenon takes place in which the evaporated fuel flowed from the fuel tank is not completely adsorbed during the stop of the engine and then discharged into the atmosphere through an atmosphere port through which the atmospheric air is introduced. This blow-by phenomenon occurs as follows: an automobile is allowed to stand for a predetermined time in a high temperature atmosphere after the drive of the automobile and the stop of the engine, so that the evaporated fuel which remains in the upstream adsorbent in the canister evaporates and diffuses in an adsorbent layer on the side of the atmosphere port to bring about the so-called diffusion phenomenon. Afterward, the diffused evaporated fuel is pushed out by the evaporated fuel fed from a fuel tank and then released into the atmosphere through the atmosphere port, thereby giving rise to the blow-by phenomenon.

This blow-by phenomenon often takes place in the conventional canister in which activated carbon A (which will hereinafter be described in detail) having characteristics that an adsorption amount of the evaporated fuel is large is used as the adsorbent in order to make the canister compact. FIG. 57 is a graph showing the blow-by amount with respect to the feed of the evaporated fuel from the fuel tank. FIG. 8 is a vertically sectional view of the canister in the conventional technique I. The graph in FIG. 7 shows the results of a test conducted in accordance with a test procedure indicated in the drawing. That is to say, purging is first done for a predetermined time from a breakthrough condition of a canister 31 in FIG. 8. This operation is repeated to stabilize the evaporated fuel, whereby a remaining amount is constantly maintained. Afterward, the canister is allowed to stand at a high temperature, and after an elapse of 36 hours, the evaporated fuel is fed to a tank port 2d of the canister 31 at a flow rate of 15 g per hour, considering the evaporated fuel which flows from a fuel tank 9 into the canister 31. Under this condition, a blow-by amount passing through an atmosphere port 2h to an inflow is measured. The blow-by amount in the conventional technique I shown in FIG. 8 where an activated charcoal A (5a) alone is used as the adsorbent is as much as about 140 mg in the case that the inflow of the evaporated fuel from the fuel tank 9 is 80 g. This reason is considered as follows: low boiling point components in the evaporated fuel which have not been purged and remain in deep portions of pores of the activated carbon evaporate and fill in a downstream adsorbent owing to a diffusion phenomenon while the canister is allowed to stand in a high temperature environment, and afterward, the low boiling point components are pushed out by the evaporated fuel subsequently fed from the fuel tank 9 and then released into the atmosphere.

Accordingly, as an improved technique for the above situations, a canister as shown in FIG. 9 is disclosed in JP-U-57-68163. This serves as a second conventional technique II. In the second conventional technique II, a plurality of activated carbon layers for fuel adsorption are disposed. An activated carbon layer 20 of activated carbon having a weak fuel adsorbability and a large effective adsorption of the fuel is arranged on the side of a communicating orifice 25a of a communicating passage 25 toward a fuel tank or a communicating orifice 22 toward an engine inlet system, and another activated carbon layer 21 of activated carbon having a strong fuel adsorbability and a small effective adsorption of the fuel and scarcely bringing about the breakthrough of the fuel before the saturation state of an adsorptive function is arranged on the side of an atmosphere releasing orifice 23 through a wire sheet 24. Most of the fuel vapor fed from the communicating passage 25 toward the fuel tank is adsorbed by the activated carbon 20 on the side of the communicating orifice 25a, and a slight part of the vapor which has broken through the activated carbon is adsorbed by the activated carbon 21 on the side of the atmosphere releasing orifice 23, so that the fuel vapor is certainly adsorbed by the activated carbon layer.

As a conventional technique II, in a canister having a combination of the above activated carbon having the weak fuel adsorbability (hereinafter referred to as "holding power") and the large effective adsorption (the activated carbon A in the present invention) and activated carbon having the strong fuel holding power and the small effective adsorption (the activated carbon C in the present invention), the blow-by amount is much smaller, about 65 mg, than that in the conventional technique I in the case that an inflow of the evaporated fuel from a tank port is 80 g, as shown in FIG. 7. However, the above blow-by amount is still insufficient, as compared with a desired value (50 mg) of the blow-by amount after standing. This is considered to be due to a fact that there is a large remaining amount of the low boiling point components in the evaporated fuel with respect to the adsorption (hereinafter referred to as "remaining amount") after the purge owing to characteristics of the above-mentioned activated carbons A and C, as shown in FIG. 6, and thus, a diffusion phenomenon occurs during the high-temperature standing, and the remaining amount of these components in the downstream adsorbent layer at the side of the air port is greatly increased, so that these components are pushed out by the evaporated fuel subsequently fed from the tank port and then the large amount of the components is released into the atmosphere.

In consequence, an object of the present invention is to provide a canister which can inhibit the diffusion phenomenon in an adsorbent layer of the canister as much as possible and which can certainly adsorb a flown evaporated fuel to inhibit the blow-by of the fuel into the atmosphere.

SUMMARY OF THE INVENTION

For the solution of the above problem, a first aspect of the present invention is directed to a canister in which adsorbent layers of a first layer and a second layer obtained by dividing an adsorbent layer with a partition wall are arranged in series, wherein the adsorbent layer of the first layer is filled with activated carbon (activated carbon A) having a large evaporated fuel adsorption and a weak holding power, and the adsorbent layer of the second layer is filled with activated carbon (activated carbon B) having an intermediate evaporated fuel adsorption and a weak holding power.

According to a second aspect of the present invention, there is provided a canister in which adsorbent layers of a first layer and a second layer obtained by dividing an adsorbent layer with a partition wall are arranged in series, wherein the adsorbent layer of the first layer is filled with activated carbon A having a large evaporated fuel adsorption and a weak holding power, and the adsorbent layer of the second layer is filled with activated carbon B having an evaporated fuel adsorption smaller than that of the activated carbon A and a holding power for evaporated fuel, substantially equal to that of the activated carbon A.

According to a third aspect of the present invention, there is provided a canister in which adsorbent layers of a first layer and a second layer obtained by dividing an adsorbent layer with a partition wall are arranged in series, wherein the adsorbent layer of the first layer is formed of activated carbon A, the adsorbent layer of the second layer is formed of activated carbon B, an evaporated fuel adsorption of the activated carbon A is larger than that of the activated carbon B, and a holding power for evaporated fuel of the activated carbon A is substantially equal to that of the activated carbon B.

In the present invention, to the activated carbons A and B is applied activated carbon which has a peak position of a differential pore distribution in the vicinity of a desorption limit line.

Further, in the present invention, to the activated carbon A can be applied activated carbon having a large pore volume, and to the activated carbon B can be applied activated carbon having a pore volume which is smaller than that of the activated carbon A.

Further, in the present invention, to the activated carbon A may be applied activated carbon in which a peak in the differential pore distribution is positioned at a pore diameter of about 2.5 nm and whose pore volume is large, and to the activated carbon B may be applied activated carbon in which a peak in the differential pore distribution is positioned at a pore diameter of about 2.5 nm and whose pore volume is smaller than that of the activated carbon A.

Further, in the invention, the adsorbent layer of the second layer can be divided into two portions by a filter or a plate having air permeability to form a second and a third adsorbent layer in the case that the adsorbent layer of the first layer is referred to as the first adsorbent layer.

In addition, a fourth aspect of the present invention is directed to a canister in which adsorbent layers of a first layer and a second layer obtained by dividing an adsorbent layer with a partition wall are arranged in series, wherein the adsorbent layer of the second layer is divided into two portions by a filter or a plate having air permeability to form a second and a third adsorbent layer; the adsorbent layer of the first layer, i.e., the first adsorbent layer is filled with activated carbon (activated carbon A) having a large evaporated fuel adsorption and a weak holding power; the second adsorbent layer is filled with activated carbon (activated carbon B) having an intermediate evaporated fuel adsorption and a weak holding power; and the third adsorbent layer is filled with activated carbon (activated carbon C) having a small evaporated fuel adsorption and a strong holding power.

According to a fifth aspect of the present invention, there is provided a canister in which adsorbent layers of a first layer and a second layer obtained by dividing an adsorbent layer with a partition wall are arranged in series, wherein the adsorbent layer of the second layer is divided into two portions by a filter or a plate having air permeability to form second and third adsorbent layers; the adsorbent layer of the first layer, i.e., the first adsorbent layer is filled with activated carbon A having a large evaporated fuel adsorption and a weak holding power; the second adsorbent layer is filled with activated carbon B which has an evaporated fuel adsorption smaller than that of the activated carbon A and whose holding power for evaporated fuel is substantially equal to that of the activated carbon A; and the third adsorbent layer is filled with activated carbon C which has an evaporated fuel adsorption smaller than that of the activated carbon B and whose holding power for evaporated fuel is stronger than those of the activated carbons A and B.

According to a sixth aspect of the present invention, there is provided a canister in which adsorbent layers of a first layer and a second layer obtained by dividing an adsorbent layer with a partition wall are arranged in series, wherein the adsorbent layer of the second layer is divided into two portions by a filter or a plate having air permeability to form second and third adsorbent layers; the adsorbent layer of the first layer, i.e., the first adsorbent layer is filled with activated carbon A; the second adsorbent layer is filled with activated carbon B; the third adsorbent layer is filled with activated carbon C; an evaporated fuel adsorption of the activated carbon B is smaller than that of the activated carbon A; the evaporated fuel adsorption of the activated carbon C is smaller than that of the activated carbon B; a holding power for evaporated fuel of the activated carbon A is substantially equal to that of the activated carbon B; and the holding power for evaporated fuel of the activated carbon C is stronger than those of the activated carbons A and B.

In the present invention, to the activated carbons A and B may be applied activated carbon which has a peak position of a differential pore distribution in the vicinity of a desorption limit line, and to the activated carbon C may be applied activated carbon whose peak position in the differential pore distribution deviates toward a remaining region from the desorption limit line.

In the present invention, to the activated carbon A may be applied activated carbon having a large pore volume, to the activated carbon B may be applied activated carbon having a pore volume which is smaller than that of the activated carbon A, and to the activated carbon C may be applied activated carbon whose pore volume is smaller than those of the activated carbons A and B.

Further in the present invention, to the activated carbon A may be applied activated carbon in which a peak in the differential pore distribution is positioned at a pore diameter of about 2.5 nm and whose pore volume is large, to the activated carbon B may be applied activated carbon in which the pore diameter of about 2.5 nm and whose pore volume is smaller than that of the activated carbon A, and to the activated carbon C may be applied activated carbon in which the peak in the differential pore distribution is positioned at the pore diameter of about 2 nm and whose pore volume is smaller than those of the activated carbons A and B.

Moreover, in the invention, the volume of the third adsorbent layer may be set in a range of from 2.3 to 4.8% of the volume of the total adsorbent layers.

BRIEF DESCRIPTION OF THE DRAWINGS

FIG. 6 is a list showing the characteristics of activated carbons used in the present invention.

DETAILED DESCRIPTION OF THE INVENTION

Desired embodiments according to the present invention will be described in reference to FIGS. 1 to 7.

First, adsorbent material for use in the present invention will be described with reference to FIGS. 4 to 6.

Figure 5:
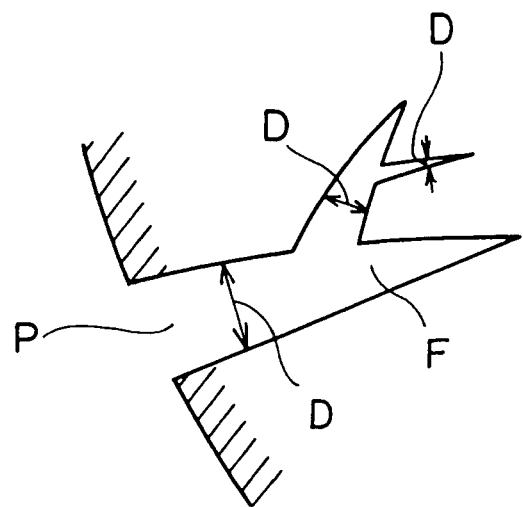
FIG. 5 is an enlarged view illustrating the pore of the activated carbon.
Figure 9:
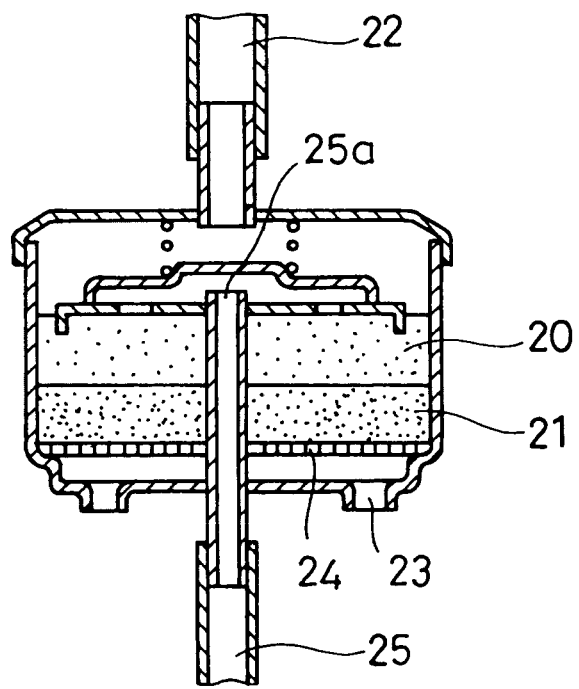
FIG. 9 is a vertically sectional view of the canister showing a conventional technique II.

The adsorbent material for use in the present invention is activated carbon, a large number of pores P as shown in FIG. 5 exist in the surface of the activated carbon, and molecules of gasoline fuel enter the pores and are captured. In FIG. 5, D denotes a pore diameter, and F denotes a volume of one pore.

Next, a differential pore distribution, and remaining and adsorption/desorption regions (at the room temperature state) of the activated carbon will be described with reference to FIG. 4.

Figure 4:
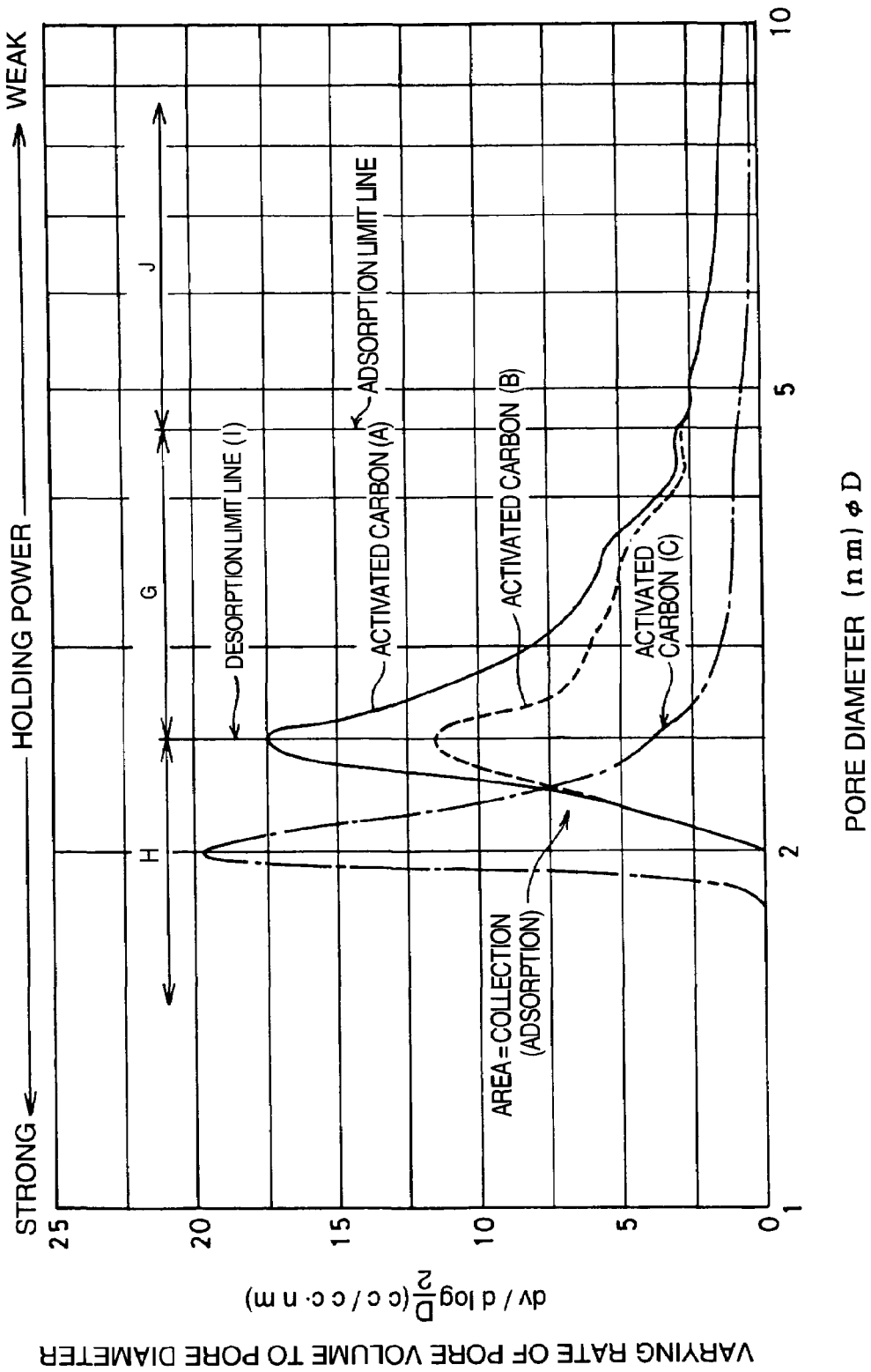
FIG. 4 is a characteristic view showing a relation between a pore diameter of activated carbon applied in the invention and a varying rate of a pore volume thereof to the pore diameter.

In FIG. 4, an abscissa axis gives a pore diameter (nm): φD, and an axis of ordinate gives a varied rate of a pore distribution: dv/dlog(D/2). Here, v means a pore total volume in an adsorbent such as an activated carbon volume of 1 cc.

A Remaining region H in FIG. 4 is a region that, since Holding Power of a pore having a pore diameter in the region is strong, once the evaporated fuel is adsorbed, it is difficult to desorb the evaporated fuel from the pore. For desorbing the evaporated fuel adsorbed in the pore, it is necessary to flow a plurality of air in the absorbent or to heat the adsorbent. The evaporated fuel is first adsorbed to the pore with the smaller pore diameter, and then to the pore with the larger one. Therefore, the pore having the diameter in the H region is the first one that is closed by the evaporated fuel.

An Adsorption/Desorption Region G of FIG. 4 is a region that a pore having a pore diameter in the region G is suitable for Adsorption/Desorption of the evaporated fuel in the automobile. As seen in FIG. 4, a plurality of the pores gather together at the positions of small pore diameters (D) in the pore distribution of each of the activated carbons, in view of the component ratio of the evaporated fuel. (Since the relatively low-boiling hydro carbon such as butane, pentane or the like makes up the majority of the evaporated fuel, each of the activated carbons is designed to have many pores having a pore diameter suitable for adsorbing the above gases, which is the reason to position a peak in the pore distribution to the small pore diameter. Incidentally, although the suitable pore region for adsorbing butane and pentane includes the region H, from the above reason, it is preferable to except the region H from the Absorption/Desorption region G.)

As seen from FIG. 4, a region (J) in which a pore diameter is larger than that in the region G is a region including a pore used as a passage to that in the regions H and G for the evaporated fuel. It is stated that the larger the passage diameter is, the larger the diffusion rate of the evaporated fuel in the pore as the passage is, and that the adsorption rate is improved.

(In this region, the diffusion of the evaporated fuel is considered to be mainly molecular diffusion, which is presented by the following formula:

$$N_A = -D_{AB} \times (dC_A/dx),$$

wherein $N_A$: diffusion rate inside a cavity of the adsorbed molecular due to molecular diffusion, $D_{AB}$: molecular diffusion coefficient, $C_A$: density of the adsorbed component, x: distance in diffused direction.)

In the pore diffusion of FIG. 4, the peak value serves as a position of the pore diameter on which dv/dlog(D/2) is maximum, and on which the total volume of the pores having the pore diameter D per unit volume of the adsorbent is larger than that of other pores having any pore diameters.

An area (pore volume v) enclosed by the abscissa axis and the distribution curve of the differential pore distribution diagram within an adsorption/desorption region G as shown in FIG. 4 has a proportional relation to an adsorption of an evaporated fuel. This can be explained by the following equation of Dubinin-Astakhov (DA equation) for frequent use as an equation indicating gas adsorption to the activated carbon.

$$W/W0 = \exp[-\{RT\ln(P0/P)/E1\}N],$$

where:

W: adsorption (volume);

W0: activated carbon volume;

R: gas constant;

T: temperature;

P0: saturated vapor pressure of adsorption gas (function of temperature T);

P: partial pressure of the adsorption gas;

E1: characteristic energy of adsorption (constant); and

N: constant.

In this equation, when the temperature (T) and partial pressure (P) are fixed, W/W0=constant is held, and the adsorption is proportional to the activated carbon volume.

Moreover, the smaller the pore diameter at the peak position in the differential pore distribution diagram is, the stronger the holding power (adsorption force) of the evaporated fuel tends to be. That is, the holding power is inversely proportional to the pore diameter. This can be explained by an adsorption potential theory of Polanyi.

That is, the power exerted for the adsorption (holding power) is an energy interaction between an adsorbent (adsorbing side) and an adsorbate (adsorbed side). An adsorption phenomenon of the evaporated fuel into the activated carbon is physical adsorption, and the power exerted for the adsorption is mostly occupied by London diffusion force (included in van der Waals force). Therefore, when the pore diameter is reduced, the London diffusion force (attraction force) acts three-dimensionally, and thus, the adsorbate receives a very large force. Therefore, it is understood that the pore diameter is inversely proportional to the holding power.

In the remaining region H of the differential pore distribution diagram, the area (pore volume v) enclosed by the distribution curve and the abscissa axis has a proportional relation to the remaining amount of low boiling point components in the evaporated fuel.

Furthermore, a blow-by amount of the evaporated fuel is proportional to a size of the pore diameter in the peak position of the differential pore distribution curve, when the adsorbed gasoline vapor is diffused within one hour (not leaving). When the vapor is diffused for six hours or more (leaving), the blow-by amount is substantially proportional to a result obtained by multiplication of the pore diameter in the peak position and the remaining amount.

In consideration of the above-described characteristics of the activated carbon, for the activated carbon for use in the present invention, three types of activated carbons having the characteristics shown in FIG. 4 are selected for use.

In FIG. 4, activated carbon A has characteristics that the peak in the differential pore distribution diagram is positioned at the pore diameter satisfactory in an adsorption/desorption balance of the gasoline vapor. In the activated carbon A, the peak is positioned at the pore diameter D of about 2.5 nm, and the area (pore volume v) formed by the curve of the activated carbon A with the abscissa in the differential pore distribution diagram is larger than that of the activated carbon B.

Therefore, the activated carbon A has characteristics that the holding power for evaporated fuel is weak and the adsorption of the evaporated fuel is large.

In activated carbon B, the peak position in the differential pore distribution diagram is the same as that of the activated carbon A, but the pore volume with respect to the diameter is smaller than that of the activated carbon A.

Therefore, the activated carbon B has characteristics that the holding power for evaporated fuel is weak in the same manner as in the activated carbon A, and the adsorption of the evaporated fuel is smaller than that of the activated carbon A.

In activated carbon C, the peak in the differential pore distribution is positioned at the pore diameter suitable for the adsorption of the low boiling point components (mainly butane) in the gasoline vapor. In the activated carbon C, the peak is positioned at the pore diameter D of about 2 nm, and the pore volume is small as compared with the activated carbons A, B.

Therefore, the activated carbon C has characteristics that the adsorption of the evaporated fuel is smaller than that of the activated carbons A, B, but the holding power for evaporated fuel is strong as compared with the activated carbons A, B.

As described above, in comparison among the activated carbons A, B, C, as shown in a table of FIG. 6, the activated carbon A has the largest adsorption of the evaporated fuel among the activated carbons A, B, C, but has a weak holding power, and thus, has an intermediate remaining amount of the low boiling point components in the evaporated fuel after purge among the activated carbons A, B, C. The activated carbon B has characteristics that the adsorption of the evaporated fuel is intermediate among the activated carbons A, B, C, and the holding power is weak, and thus, the remaining amount of the low boiling point components in the evaporated fuel after the purge is the smallest among the activated carbons A, B, C. The activated carbon C has characteristics that the adsorption of the evaporated fuel is the smallest among the activated carbons A, B, C, but the holding power is stronger than those of the activated carbons A, B, and thus, the remaining amount of the low boiling point components in the evaporated fuel after the purge is the largest among the activated carbons A, B, C.

As described above, by applying to the activated carbons A, B the activated carbon whose peak position of the curve in the differential pore distribution is in the vicinity of a desorption limit line I in FIG. 4, it is possible to prepare the activated carbon which can reduce the remaining amount of the evaporated fuel after the purge for the activated carbons A, B. To the activated carbon C is applied the activated carbon whose peak position of the curve in the differential pore distribution largely deviates toward the remaining region H from the desorption limit line I.

With regard to the blow-by amount during the inflow of the evaporated fuel from the fuel tank, in the case that the canister is allowed to stand at a high temperature for a predetermined time after the purge, i.e., in the case of leaving, the blow-by amounts of the activated carbons A and C are large, but that of the activated carbon B is small. This is considered to be due to a fact that the low boiling point components in the evaporated fuel which remain in the activated carbon after the purge evaporate during the leaving at the high temperature to bring about a diffusion phenomenon, so that the canister is filled with the components and these components are pushed out by the inflow evaporated fuel to give rise to the blow-by. That is to say, since the blow-by amount is proportional to the result obtained by multiplication of the pore diameter in the peak position and the remaining amount, as mentioned above, in comparison among the activated carbons A, B, C, the blow-by amount in the activated carbons A and C is large, and the blow-by amount in the activated carbon B is small.

However, in the case that the canister is not left at the high temperature after the purge, i.e., in the case of not leaving, in all of the activated carbons A, B and C, the blow-by amount is small. This is due to a fact that even if the low boiling point components in the evaporated fuel remain in the activated carbons, any diffusion phenomenon by the evaporation of the low boiling point components does not substantially occur, because the canister is not left at high-temperature. Therefore, in order to inhibit the increase of the blow-by amount after leaving at the high-temperature, it is necessary that the pore diameter at the peak position is selected and the amount of the low boiling point components in the evaporated fuel which remains after the purge is small. It is to be noted that the above activated carbons having the various characteristics can easily be manufactured by a manufacturer of the activated carbons in accordance with requested characteristics.

Next, the canister according to a first embodiment of the invention in which the above activated carbons are used will be described with reference to FIG. 1.

Figure 1:
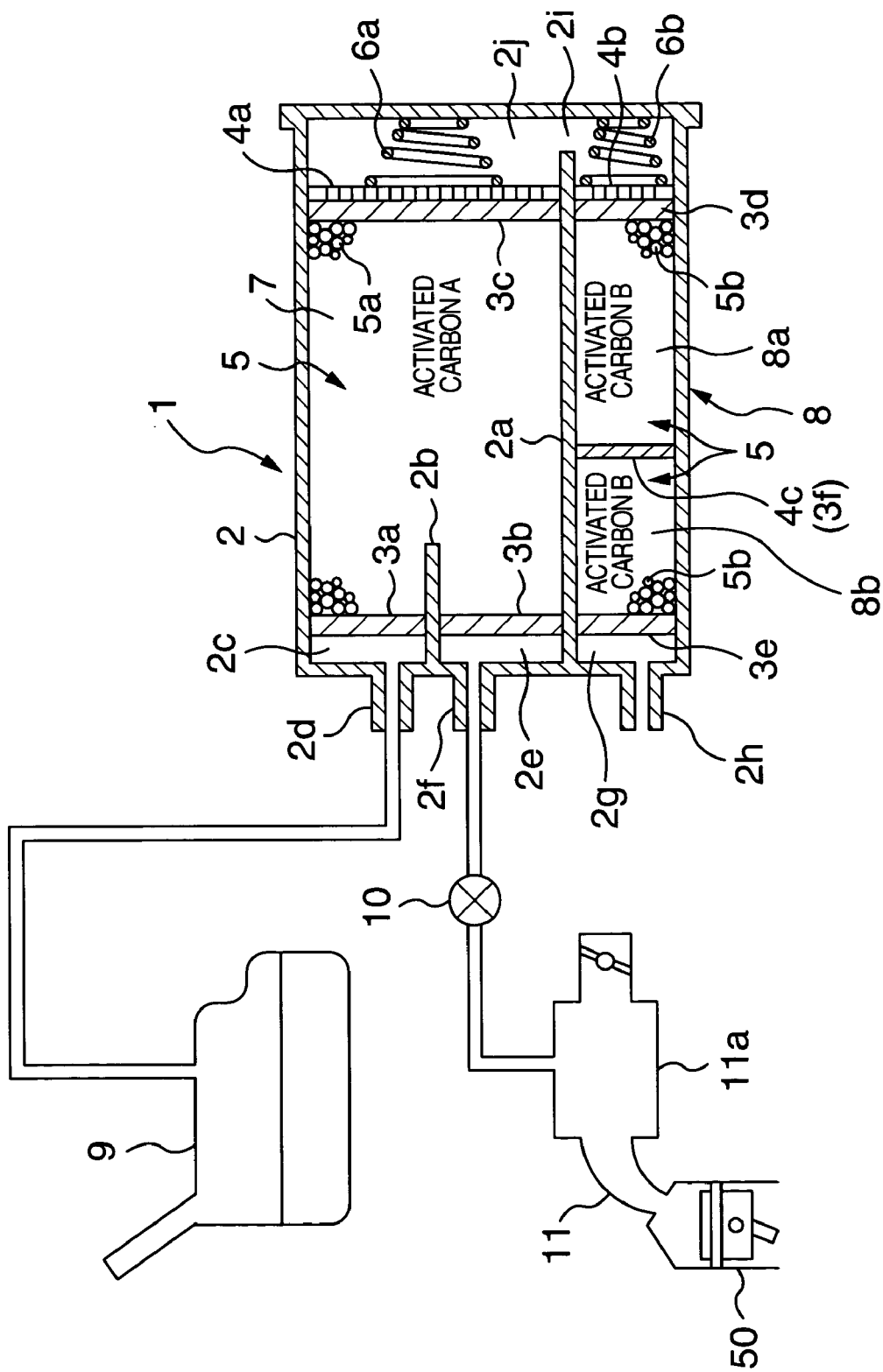
FIG. 1 is a vertically sectional view of a canister according to a first embodiment of the present invention.

In FIG. 1, the interior of a case 2 constituting a canister 1 is divided into two portions by a partition wall 2a. In one portion, an adsorbent 5 held between filters 3a, 3b, 3c having air permeability is pressed by a spring 6a via a plate 4a having an air permeability, for example, a perforated plate 4a to form an adsorbent layer of a first layer, i.e., a first adsorbent layer 7. In another portion, similarly, the adsorbent 5 held between filters 3d and 3e having the air permeability is pressed by a spring 6b via a plate 4b having the air permeability, for example, a perforated plate 4b to form an adsorbent layer 8 of a second layer. This adsorbent layer 8 of the second layer is partitioned into two portions by a plate 4c having the air permeability, for example, a perforated plate 4c or a filter 3f to form a second adsorbent layer 8a and a third adsorbent layer 8b.

Through a first space portion 2c defined by the case 2, the filter 3a and a division plate 2b, a tank port 2d is opened which is connected to the upper portion of a fuel tank 9. Through a second space portion 2e defined by the case 2, the filter 3b and the division plate 2b, a purge port 2f is opened which is connected to a surging tank 11a on an intake pipe 11 via a flow regulating valve 10. Through a third space portion 2g defined by the case 2, the filter 3e and the partition wall 2a, an atmosphere port 2h is opened which is connected to the atmosphere. At the tip of the partition wall 2a, a communicating path 2i is disposed, and a fourth space portion 2j is defined by the case 2 and the plates 4a, 4b. Thus, the adsorbent layers 7, 8a, 8b are arranged in series to the flow of an evaporated fuel via the fourth space portion 2j.

The first adsorbent layer 7 is filled, as the adsorbent 5, with the above mentioned activated carbon A (5a) having a relatively large evaporated fuel adsorption and a weak holding power and therefore containing low boiling point components of the evaporated fuel which remain in large quantities after purge. The second adsorbent layer 8a and the third adsorbent layer 8b are each filled with activated carbon B (5b) having an intermediate evaporated fuel adsorption, which is smaller than that of the activated carbon A, and a weak holding power similar as the activated carbon A, and thus, containing the low boiling point components in the evaporated fuel which remain less than the activated carbon A after the purge. It is to be noted that the respective layers are constituted so that the volume of the third adsorbent layer 8b may be 300 cc, that of the first adsorbent layer 7 may be 1400 cc, and that of the total adsorbent layers may be 2100 cc.

Next, the function of the first embodiment will be described. In FIG. 1, the evaporated fuel generated from the fuel tank 9 during the stop of an engine is allowed to flow through the tank port 2d into the activated carbon A (5a) in the first adsorbent layer 7 and then the activated carbon B (5b) in the second adsorbent layer 8a and the second adsorbent layer 8b, in which the evaporated fuel is adsorbed in turn, whereby the blow-by of the fuel into the atmosphere is inhibited. Next, when the engine 50 is started and the negative pressure is generated in the intake pipe 11, the evaporated fuel adsorbed by the activated carbons A (5a) and B (5b) is purged through a purge port 2f together with the atmospheric air introduced through an atmosphere port 2h by the negative pressure in the intake pipe 11. After they have been purged for a predetermined time, the engine 50 is stopped, and the vehicle is allowed to stand for a predetermined time in a room maintained at a predetermined temperature.

Figure 7:
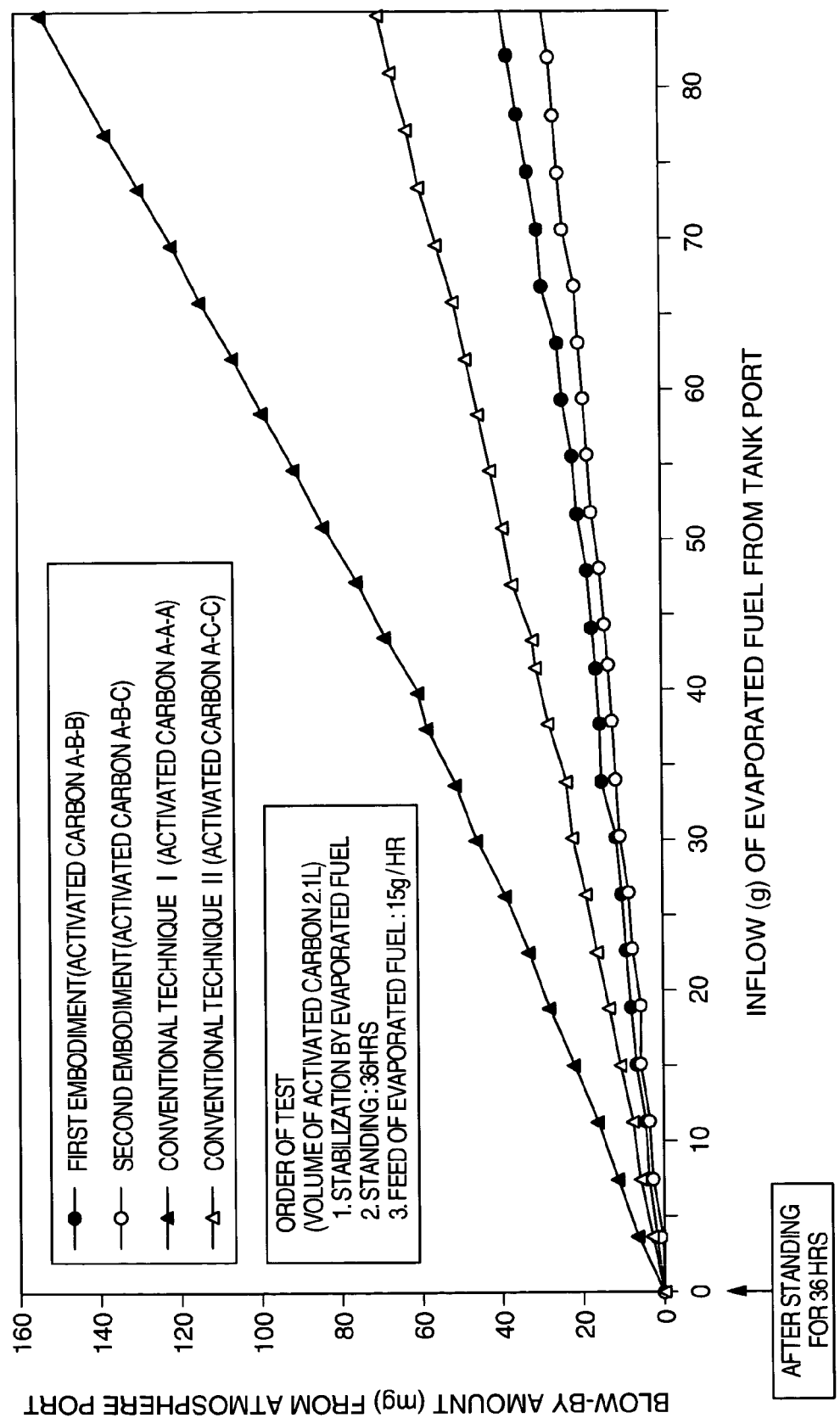
FIG. 7 is a graph showing the measured test results of blow-by amounts of conventional canisters and the canisters according to the present invention.
Figure 8:
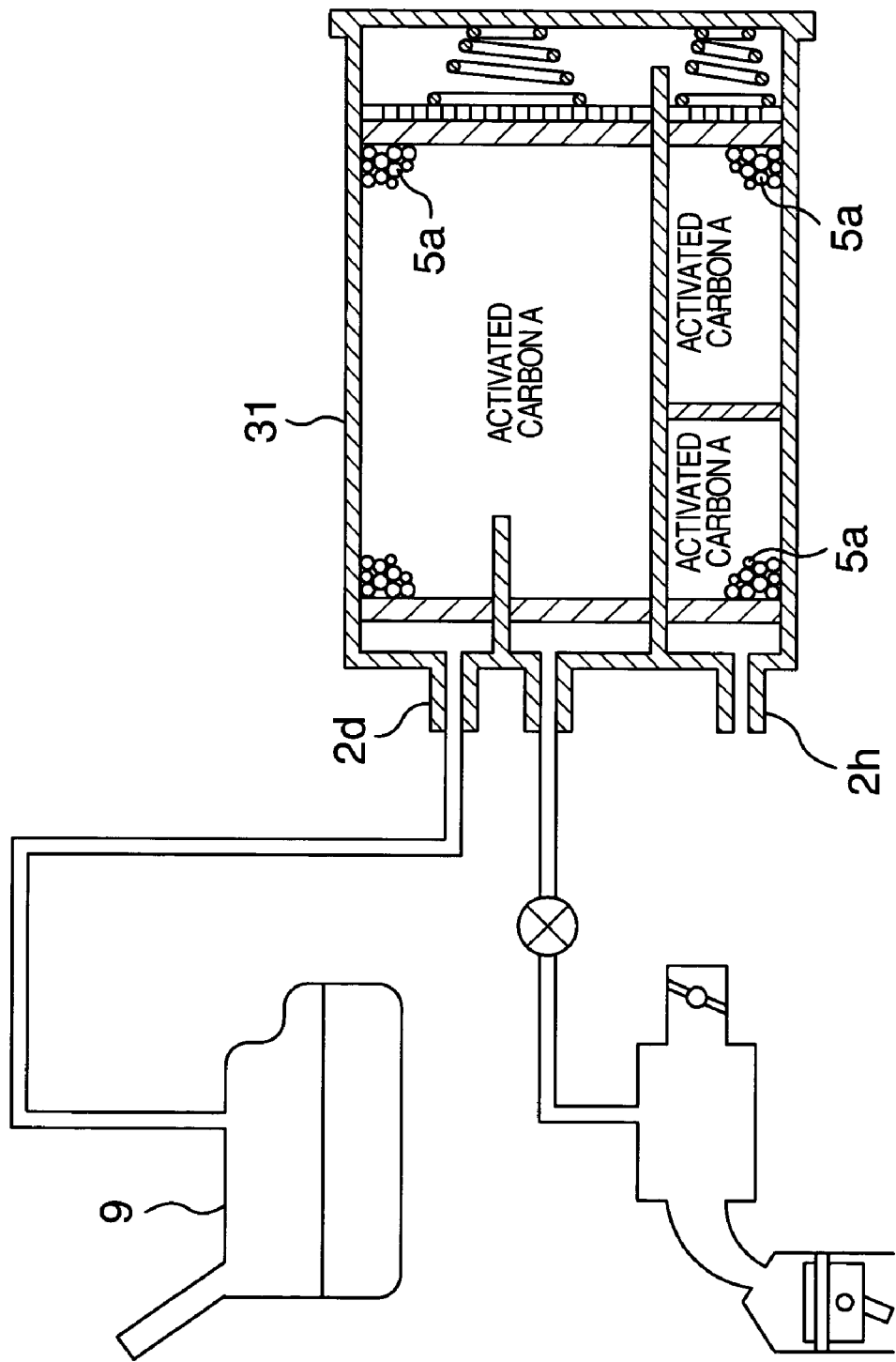
FIG. 8 is a vertically sectional view of the canister showing a conventional technique I.

While this period of time, the canister 1 is allowed to stand at a high temperature in a state where a predetermined amount of the low boiling point components is present in the activated carbon A (5a), and hence, the remaining fuel evaporates and diffuses to flow toward the downstream of the canister 1 toward the atmosphere port 2h, but is then adsorbed by the activated carbon B (5b) in the second and the third adsorbent layers 8a, 8b in which the remaining amount of the low boiling point components in the fuel is small. Afterward, the evaporated fuel fed from the fuel tank 9 is also adsorbed by the activated carbon B (5b), and hence, the discharge of the evaporated fuel into the atmosphere can be certainly inhibited. In the canister using the activated carbon B, as the result that the blow-by amount is measured in the above condition, in FIG. 7, the blow-by amount is less than 40 mg in the case that the feed of the evaporated fuel from the tank port 2d is 80 g, which means that the blow-by amount remarkably decreases as compared with the conventional techniques I and II. It is to be noted that the volume of the total adsorbent layers in the canister used for the measurement of the blow-by in FIG. 7 is 2100 cc, that of the first adsorbent layer 7 is 1400 cc, and that of the third adsorbent layer 8b may be 300 cc.

It is to be noted that in the first embodiment, the second layer is divided into two portions by the filter or the plate 4c (3f) having the air permeability. Accordingly, the flow resistance can be formed by the filter and the like between the second adsorbent layer 8a and the third adsorbent layer 8b to further inhibit the amount of the evaporated fuel released into the atmosphere through the third adsorbent layer 8b.

Figure 2:
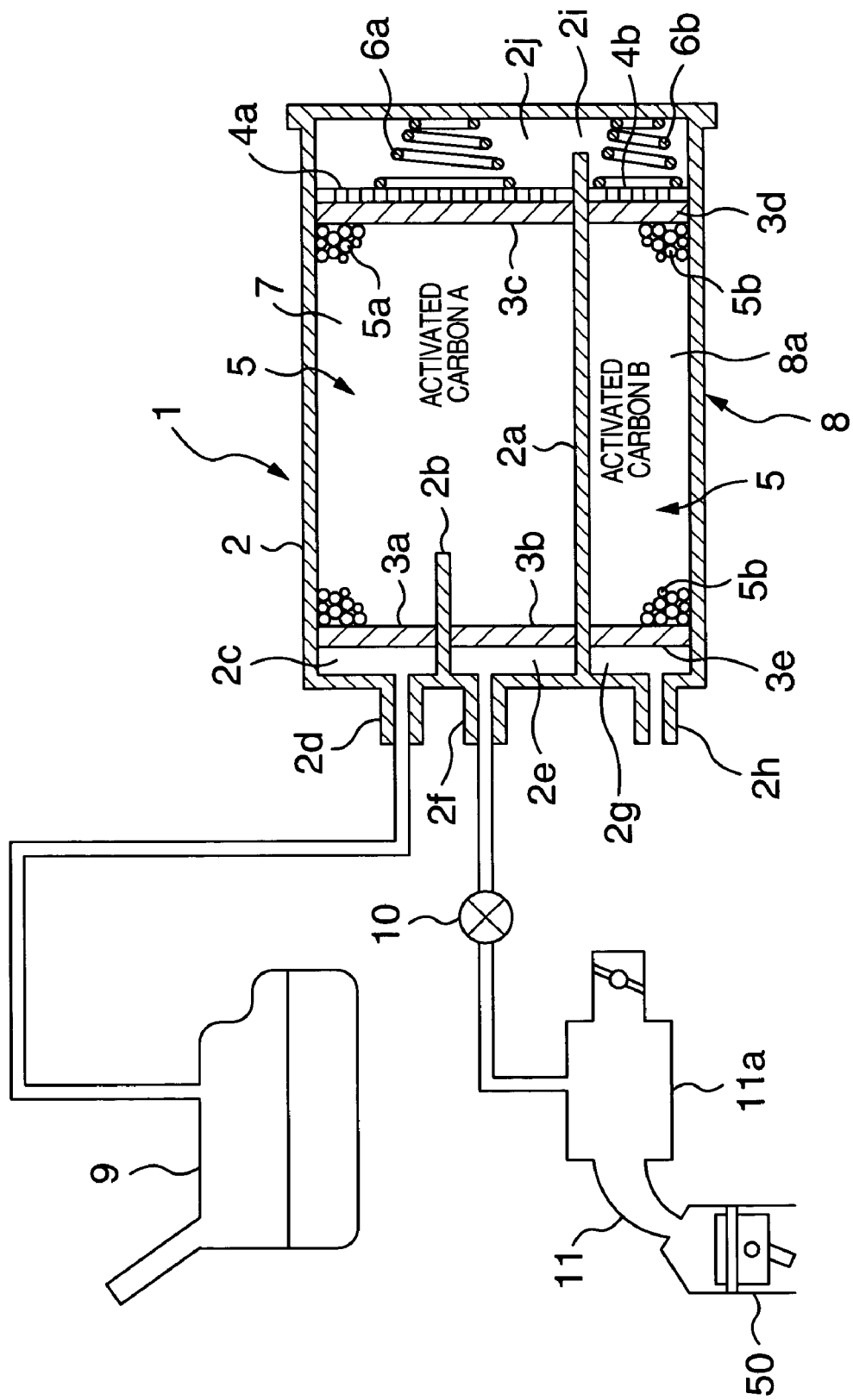
FIG. 2 is a vertically sectional view of a canister according to a second embodiment of the present invention.

FIG. 2 shows a second embodiment modifying the first embodiment in FIG. 1.

In the second embodiment, the plate 4c or filter 3f for separating the second adsorbent layer 8a from the third adsorbent layer 8b in the first embodiment is removed. Thus, the second adsorbent layer 8a and the third adsorbent layer 8b in the first embodiment are integrally formed with each other to integrally form the adsorbent layer 8 of the second layer filled with the activated carbon B.

The other constitutions are the same as these in the first embodiment, therefore the same components as described above are denoted with the same reference numerals, and the description is omitted.

Also in the second embodiment, the same function and effect as those of the first embodiment are produced (additionally, the function/effect of the plate 4c or filter 3f is excluded). Furthermore, since the plate 4c or the filter 3f is removed, the structure/manufacturing is further simplified and cost can be reduced as compared with the first embodiment.

Next, a third embodiment shown in FIG. 3 will be described.

It is to be noted that only parts different from those of the first embodiment will be described, and the description of the same function part will be omitted.

Figure 3:
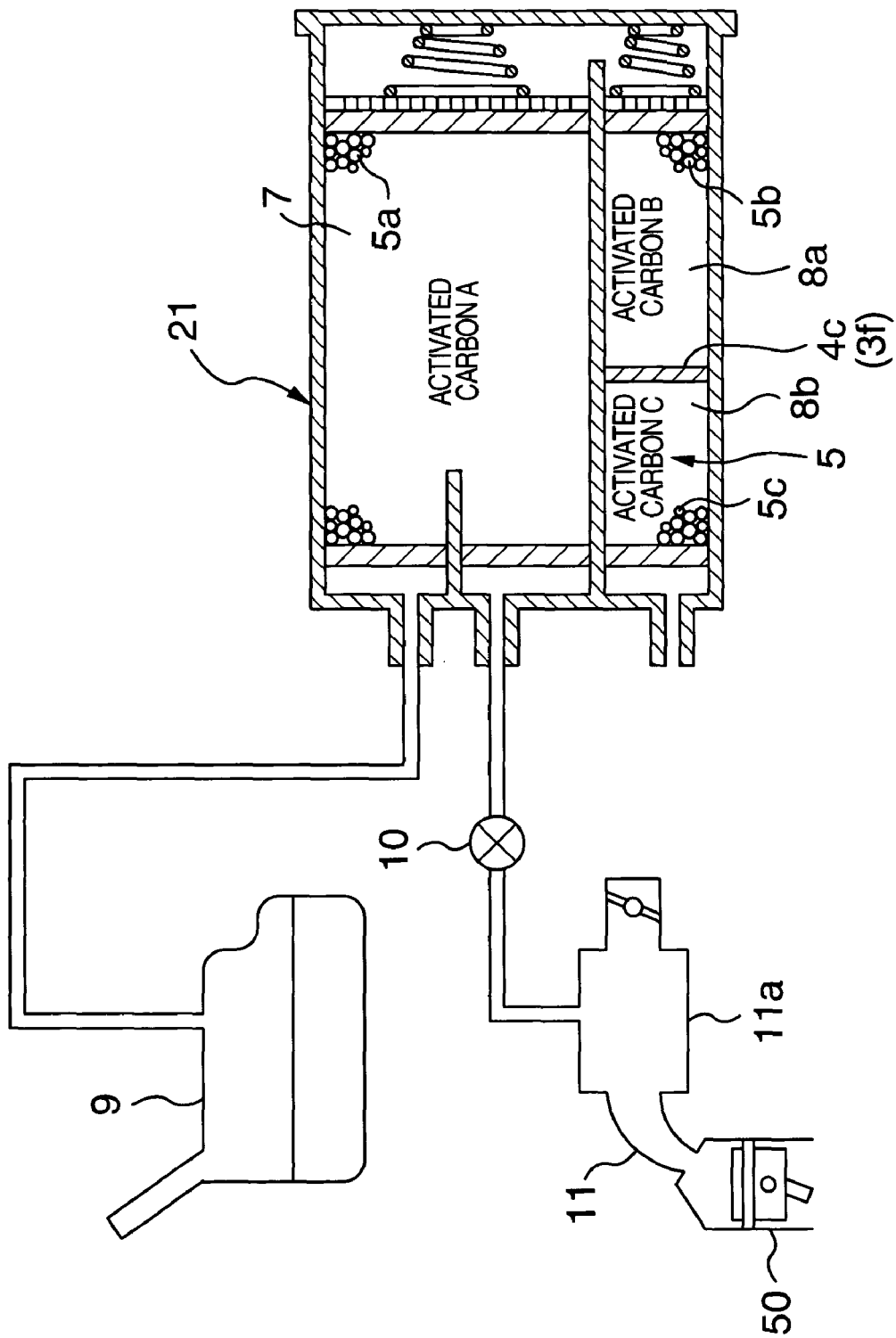
FIG. 3 is a vertically sectional view of a canister according to a third embodiment of the present invention.

FIG. 3 is a vertically sectional view of the canister according to the third embodiment of the present invention.

In FIG. 3, the first adsorbent layer 7 is filled with the activated carbon A (5a) in the first embodiment, and the second adsorbent layer 8a is filled with the activated carbon B (5b) in the first embodiment, but the third adsorbent layer 8b is filled with the activated carbon C which is different from the activated carbons A and B.

In the activated carbon C, the adsorption of the evaporated fuel is small as compared with the activated carbons A and B, but the holding power for evaporated fuel is strong as compared with the activated carbons A and B. Therefore, the remaining amount of the low boiling point components in the evaporated fuel after the purge is large as compared with the activated carbons A and B.

The function of the third embodiment will be described.

It is to be noted that the process until the adsorption of the evaporated fuel during the stop of the engine is the same as that in the first embodiment, and hence the process will be described from the stage of the purge after the engine starts.

In the purge stage after the start of the engine 50, the evaporated fuel adsorbed by the activated carbon C (5c) in the third adsorbent layer 8b is purged by the negative pressure of the intake pipe 11, generated in the purge port 2f.

However, the activated carbon C (5c) has characteristics that the remaining amount of the low boiling point components in the evaporated fuel after the purge is large with respect to the adsorption. Therefore, in general, even after the purge ends, the remaining amount is large. However, the adsorption in the activated carbon C is small, and the third adsorbent layer 8b filled with the activated carbon C is closest to the atmosphere. Therefore, with the purge start, the fuel is effectively purged by fresh air introduced via the atmosphere port 2h. Accordingly, the small remaining amount exists even after the purge ends. In addition, in the stage where the automobile is allowed to stand at a high temperature, the low boiling point components remaining in the first adsorbent layer evaporate and diffuse. Even if this phenomenon occurs, the components are adsorbed by the second adsorbent layer filled with the activated carbon B. Therefore, the remaining amount of the third adsorbent layer can be reduced as compared with the conventional art.

Afterward, even when the evaporated fuel flows into the canister 1 from the fuel tank 9, most of the evaporated fuel is adsorbed by the activated carbons A, B of the first and second adsorbent layers 7, 8a. Even a slight amount of the evaporated fuel which has not been adsorbed is securely adsorbed by the activated carbon C of the third adsorbent layer 8b having a margin in the adsorption and a strong adsorption power (holding power) so that the blow-by into the atmosphere can be inhibited.

Next, when the volume of the third adsorbent layer 8b is set to 2.3 to 4.8% of the total volume of the adsorbent layer, for example, the total volume of the adsorbent layer is set to 2100 cc, and the volume of the third adsorbent layer 8b is set to 50 cc. This case will be described.

Incidentally, the process until the adsorption of the evaporated fuel during the stop of the engine is the same as that in the first embodiment, and hence its description will be omitted. The description will be made from the step of the purge after the start of the engine.

In FIG. 3, substantially all of the evaporated fuel adsorbed by the activated carbon C (5c) in the third adsorbent layer 8b is purged by a negative pressure of the intake pipe 11 generated in the purge port 2f, in a purge step after the start of the engine 50. This reason is that the activated carbon C (5c) has the characteristics of allowing the low boiling point components in the evaporated fuel to remain in large quantities after the purge, but the volume of the third adsorbent layer 8b is reduced set to 50 cc which is about 2.4% of 2100 cc which is the total volume, whereby it is possible to make the remaining amount in the third adsorbent layer substantially zero by the fresh air introduced from the atmosphere port.

Therefore, in the step of the high-temperature standing after the completion of the purge, the low boiling components which remain in the first adsorbent layer 7 evaporate to give rise to a diffusion phenomenon, but these components are adsorbed by the second adsorbent layer 8a filled with the activated carbon B (5b), and the remaining amount in the third adsorbent layer at the atmosphere port side hardly increases. Thereafter, even if the evaporated fuel is subsequently fed from the fuel tank 9, the evaporated fuel is adsorbed by the second adsorbent layer 8a, and the evaporated fuel which is not adsorbed by the second adsorbent layer 8a is certainly adsorbed by the third adsorbent layer 8b. In consequence, the blow-by or the discharge of the evaporated fuel into the atmosphere is inhibited. In FIG. 7, the blow-by amount is less than 30 mg in the case that the feed of the evaporated fuel is 80 g, which means that the blow-by amount is remarkably smaller as compared with the conventional techniques I and II, and it is also smaller as compared with the first embodiment. Incidentally, it has been confirmed that when the volume of the third adsorbent layer 8b is in a range of 50 to 100 cc (2.3 to 4.8%) with respect to 2100 cc of the total volume, the above-mentioned effect can be maintained, but when the volume of the third adsorbent layer 8b is 200 cc, the effect decreases. Incidentally, with respect to the conventional technique, since the activated carbon B is displaced upstream of the activated carbon C, it is possible to reduce the blow-by amount.

Since the present invention is constituted as described above, the following effects can be exerted.

That is to say, according to the first to third aspects of the present invention, an adsorption layer of the first layer of a canister is filled with activated carbon A, and an adsorption layer of the second layer is filled with activated carbon B having characteristics that the residual amount of the low boiling point components in an evaporated fuel after purge is small. Therefore, after the high temperature standing of the canister, the discharge of the evaporated fuel into the atmosphere can be inhibited.

Furthermore, in the above-mentioned aspects, an adsorption layer of the second layer may be divided into two portions by a filter or a plate having air permeability to form the second and the third adsorbent layers in addition to the adsorbent layer of the first layer, i.e., the first adsorbent layer. Therefore, a flow resistance can be formed by the plate or the like between the second adsorbent layer and the third adsorbent layer to inhibit the amount of the evaporated fuel released into the atmosphere through the third adsorbent layer.

Furthermore, according to the fourth to sixth aspects of the present invention, the first adsorbent layer of the canister is filled with the activated carbon A, the second adsorbent layer is filled with the activated carbon B, and the third adsorbent layer is filled with the activated carbon C. Therefore, after the high temperature standing of the canister, the discharge of the evaporated fuel into the atmosphere can further be inhibited.

Further, when the volume of the third adsorbent layer is set in a range of 2.3 to 4.8% of the total volume of the adsorbent layers, the effect obtained by the above aspects can be further improved.

What is claimed is:

1. A canister in which adsorbent layers of a first layer and a second layer obtained by dividing an adsorbent layer with a partition wall are arranged in series, wherein the adsorbent layer of the first layer is filled with activated carbon (activated carbon A) having a large evaporated fuel adsorption and a weak holding power, and the adsorbent layer of the second layer is filled with activated carbon (activated carbon B) having an intermediate evaporated fuel adsorption and a weak holding power.

2. The canister according to claim 1, wherein to the activated carbons A and B is applied activated carbon which has a peak position of a differential pore distribution in the vicinity of a desorption limit line.

3. The canister according to claim 1, wherein to the activated carbon A is applied activated carbon having a large pore volume, and to the activated carbon B is applied activated carbon having a pore volume which is smaller than that of the activated carbon A.

4. The canister according to claim 1, wherein to the activated carbon A is applied activated carbon in which a peak in the differential pore distribution is positioned at a pore diameter of about 2.5 nm and whose pore volume is large, and to the activated carbon B is applied activated carbon in which a peak in the differential pore distribution is positioned at the pore diameter of about 2.5 nm and whose pore volume is smaller than that of the activated carbon A.

5. The canister according to claim 1, wherein the adsorbent layer of the second layer is divided into two portions by a filter or a plate having air permeability to form a second and a third adsorbent layers in the case that the adsorbent layer of the first layer is referred to as the first adsorbent layer.

6. A canister in which adsorbent layers of a first layer and a second layer obtained by dividing an adsorbent layer with a partition wall are arranged in series, wherein the adsorbent layer of the first layer is filled with activated carbon A having a large evaporated fuel adsorption and a weak holding power, and the adsorbent layer of the second layer is filled with activated carbon B having an evaporated fuel adsorption smaller than that of the activated carbon A and a holding power for evaporated fuel, substantially equal to that of the activated carbon A.

7. The canister according to claim 6, wherein to the activated carbons A and B is applied activated carbon which has a peak position of a differential pore distribution in the vicinity of a desorption limit line.

8. The canister according to claim 6, wherein to the activated carbon A is applied activated carbon having a large pore volume, and to the activated carbon B is applied activated carbon having a pore volume which is smaller than that of the activated carbon A.

9. The canister according to claim 6, wherein to the activated carbon A is applied activated carbon in which a peak in the differential pore distribution is positioned at a pore diameter of about 2.5 nm and whose pore volume is large, and to the activated carbon B is applied activated carbon in which a peak in the differential pore distribution is positioned at the pore diameter of about 2.5 nm and whose pore volume is smaller than that of the activated carbon A.

10. The canister according to claim 6, wherein the adsorbent layer of the second layer is divided into two portions by a filter or a plate having air permeability to form a second and a third adsorbent layers in the case that the adsorbent layer of the first layer is referred to as the first adsorbent layer.

11. A canister in which adsorbent layers of a first layer and a second layer obtained by dividing an adsorbent layer with a partition wall are arranged in series, wherein the adsorbent layer of the first layer is formed of activated carbon A, the adsorbent layer of the second layer is formed of activated carbon B, an evaporated fuel adsorption of the activated carbon A is larger than that of the activated carbon B, and a holding power for evaporated fuel of the activated carbon A is substantially equal to that of the activated carbon B.

12. The canister according to claim 11, wherein to the activated carbons A and B is applied activated carbon which has a peak position of a differential pore distribution in the vicinity of a desorption limit line.

13. The canister according to claim 11, wherein to the activated carbon A is applied activated carbon having a large pore volume, and to the activated carbon B is applied activated carbon having a pore volume which is smaller than that of the activated carbon A.

14. The canister according to claim 11, wherein to the activated carbon A is applied activated carbon in which a peak in the differential pore distribution is positioned at a pore diameter of about 2.5 nm and whose pore volume is large, and to the activated carbon B is applied activated carbon in which a peak in the differential pore distribution is positioned at the pore diameter of about 2.5 nm and whose pore volume is smaller than that of the activated carbon A.

15. The canister according to claim 11, wherein the adsorbent layer of the second layer is divided into two portions by a filter or a plate having air permeability to form a second and a third adsorbent layers in the case that the adsorbent layer of the first layer is referred to as the first adsorbent layer.

16. A canister in which adsorbent layers of a first layer and a second layer obtained by dividing an adsorbent layer with a partition wall are arranged in series, wherein the adsorbent layer of the second layer is divided into two portions by a filter or a plate having air permeability to form a second and a third adsorbent layers; the adsorbent layer of the first layer, i.e., the first adsorbent layer is filled with activated carbon (activated carbon A) having a large evaporated fuel adsorption and a weak holding power; the second adsorbent layer is filled with activated carbon (activated carbon B) having an intermediate evaporated fuel adsorption and a weak holding power; and the third adsorbent layer is filled with activated carbon (activated carbon C) having a small evaporated fuel adsorption and a strong holding power.

17. The canister according to claim 16, wherein to the activated carbons A and B is applied activated carbon which has a peak position of a differential pore distribution in the vicinity of a desorption limit line, and to the activated carbon C is applied activated carbon whose peak position of the differential pore distribution deviates toward a remaining region side from the desorption limit line.

18. The canister according to claim 16, wherein to the activated carbon A is applied activated carbon having a large pore volume, to the activated carbon B is applied activated carbon having a pore volume which is smaller than that of the activated carbon A, and to the activated carbon C is applied activated carbon whose pore volume is smaller than those of the activated carbons A and B.

19. The canister according to claim 16, wherein to the activated carbon A is applied activated carbon in which a peak in the differential pore distribution is positioned at a pore diameter of about 2.5 nm and whose pore volume is large, to the activated carbon B is applied activated carbon in which the peak in the differential pore distribution is positioned at the pore diameter of about 2.5 nm and whose pore volume is smaller than that of the activated carbon A, and to the activated carbon C is applied activated carbon in which the peak in the differential pore distribution is positioned at the pore having the diameter of about 2 nm and whose pore volume is smaller than those of the activated carbons A and B.

20. The canister according to claim 16, wherein the volume of the third adsorbent layer is set in a range of from 2.3 to 4.8% of the volume of the total adsorbent layers.

21. A canister in which adsorbent layers of a first layer and a second layer obtained by dividing an adsorbent layer with a partition wall are arranged in series, wherein the adsorbent layer of the second layer is divided into two portions by a filter or a plate having air permeability to form second and third adsorbent layers; the adsorbent layer of the first layer, that is, the first adsorbent layer is filled with activated carbon A having a large evaporated fuel adsorption and a weak holding power; the second adsorbent layer is filled with activated carbon B which has an evaporated fuel adsorption smaller than that of the activated carbon A and whose holding power for evaporated fuel is substantially equal to that of the activated carbon A; and the third adsorbent layer is filled with activated carbon C which has an evaporated fuel adsorption smaller than that of the activated carbon B and whose holding power for the evaporated fuel is stronger than those of the activated carbons A and B.

22. The canister according to claim 21, wherein to the activated carbons A and B is applied activated carbon which has a peak position of a differential pore distribution in the vicinity of a desorption limit line, and to the activated carbon C is applied activated carbon whose peak position of the differential pore distribution deviates toward a remaining region side from the desorption limit line.

23. The canister according to claim 21, wherein to the activated carbon A is applied activated carbon having a large pore volume, to the activated carbon B is applied activated carbon having a pore volume which is smaller than that of the activated carbon A, and to the activated carbon C is applied activated carbon whose pore volume is smaller than those of the activated carbons A and B.

24. The canister according to claim 21, wherein to the activated carbon A is applied activated carbon in which a peak in the differential pore distribution is positioned at a pore diameter of about 2.5 nm and whose pore volume is large, to the activated carbon B is applied activated carbon in which the peak in the differential pore distribution is positioned at the pore diameter of about 2.5 nm and whose pore volume is smaller than that of the activated carbon A, and to the activated carbon C is applied activated carbon in which the peak in the differential pore distribution is positioned at the pore having the diameter of about 2 nm and whose pore volume is smaller than those of the activated carbons A and B.

25. The canister according to claim 21, wherein the volume of the third adsorbent layer is set in a range of from 2.3 to 4.8% of the volume of the total adsorbent layers.

26. A canister in which adsorbent layers of a first layer and a second layer obtained by dividing an adsorbent layer with a partition wall are arranged in series, wherein the adsorbent layer of the second layer is divided into two portions by a filter or a plate having air permeability to form second and third adsorbent layers; the adsorbent layer of the first layer, that is, the first adsorbent layer is filled with activated carbon A; the second adsorbent layer is filled with activated carbon B; the third adsorbent layer is filled with activated carbon C; an evaporated fuel adsorption of the activated carbon B is smaller than that of the activated carbon A; the evaporated fuel adsorption of the activated carbon C is smaller than that of the activated carbon B; a holding power for evaporated fuel of the activated carbon A is substantially equal to that of the activated carbon B; and the holding power for evaporated fuel of the activated carbon C is stronger than those of the activated carbons A and B.

27. The canister according to claim 26, wherein to the activated carbons A and B is applied activated carbon which has a peak position of a differential pore distribution in the vicinity of a desorption limit line, and to the activated carbon C is applied activated carbon whose peak position of the differential pore distribution deviates toward a remaining region side from the desorption limit line.

28. The canister according to claim 26, wherein to the activated carbon A is applied activated carbon having a large pore volume, to the activated carbon B is applied activated carbon having a pore volume which is smaller than that of the activated carbon A, and to the activated carbon C is applied activated carbon whose pore volume is smaller than those of the activated carbons A and B.

29. The canister according to claim 26, wherein to the activated carbon A is applied activated carbon in which a peak in the differential pore distribution is positioned at a pore diameter of about 2.5 nm and whose pore volume is large, to the activated carbon B is applied activated carbon in which the peak in the differential pore distribution is positioned at the pore diameter of about 2.5 nm and whose pore volume is smaller than that of the activated carbon A, and to the activated carbon C is applied activated carbon in which the peak in the differential tore distribution is positioned at the pore having the diameter of about 2 nm and whose pore volume is smaller than those of the activated carbons A and B.

30. The canister according to claim 26, wherein the volume of the third adsorbent layer is set in a range of from 2.3 to 4.8% of the volume of the total adsorbent layers.

* * * * *